(12) United States Patent
Miyoshi et al.

(10) Patent No.: US 10,587,111 B2
(45) Date of Patent: Mar. 10, 2020

(54) SHORT-CIRCUIT FAULT DETECTION DEVICE

(71) Applicant: TOYOTA JIDOSHA KABUSHIKI KAISHA, Toyota-shi, Aichi-ken (JP)

(72) Inventors: Tatsuya Miyoshi, Nisshin (JP); Haruki Matsuoka, Kuwana (JP); Masahiro Oguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/808,230

(22) Filed: Nov. 9, 2017

(65) Prior Publication Data

US 2018/0152014 A1 May 31, 2018

(30) Foreign Application Priority Data

Nov. 30, 2016 (JP) .................. 2016-232374

(51) Int. Cl.
| | |
|---|---|
| *H02H 3/16* | (2006.01) |
| *H02M 1/32* | (2007.01) |
| *H02M 3/158* | (2006.01) |
| *H02H 7/12* | (2006.01) |
| *H02M 1/088* | (2006.01) |
| *H02M 3/155* | (2006.01) |
| *H02H 1/00* | (2006.01) |

(52) U.S. Cl.
CPC ............ *H02H 3/16* (2013.01); *H02H 7/1213* (2013.01); *H02M 1/088* (2013.01); *H02M 1/32* (2013.01); *H02M 3/155* (2013.01); *H02M 3/1582* (2013.01); *H02H 1/0007* (2013.01)

(58) Field of Classification Search
USPC .............................................. 361/18, 86–87
See application file for complete search history.

(56) References Cited

U.S. PATENT DOCUMENTS

| | | | | |
|---|---|---|---|---|
| 2009/0284998 | A1* | 11/2009 | Zhang ...................... | G05F 1/67 363/55 |
| 2012/0206118 | A1* | 8/2012 | Williams ................ | H02J 3/385 323/282 |

FOREIGN PATENT DOCUMENTS

| | | |
|---|---|---|
| JP | 2012-029435 A | 2/2012 |
| JP | 2015-207238 A | 11/2015 |
| JP | 2016-171637 A | 9/2016 |

* cited by examiner

*Primary Examiner* — Danny Nguyen
(74) *Attorney, Agent, or Firm* — Oliff PLC

(57) ABSTRACT

A short-circuit fault detection device detects a short-circuit fault in a step-up and step-down DC-DC converter that takes generated power of a solar cell as an input and outputs a predetermined voltage to a power storage. The DC-DC converter includes a step-up upper arm, a step-up lower arm, a step-down upper arm, and a step-down lower arm. The short-circuit fault detection device includes a voltage detection unit detecting a voltage output to the DC-DC converter from the solar cell, a current detection unit detecting a current output to the power storage from the DC-DC converter, and a controller controlling switching elements constituting the DC-DC converter to determine whether each arm of the DC-DC converter has a short-circuit fault based on a detected voltage value that is a detected value of the voltage detection unit, and a detected current value that is a detected value of the current detection unit.

7 Claims, 5 Drawing Sheets

| TARGET | STEP-DOWN SIDE | | STEP-UP SIDE | | SHORT-CIRCUIT FAULT DETERMINATION CONDITION |
|---|---|---|---|---|---|
| | M1 | D2 | M3 | D4 | |
| SHORT-CIRCUIT FAULT OF M1 | OFF | — | ON | — | $V_{in} < V_{th1}$ |
| SHORT-CIRCUIT FAULT OF D2 | ON | — | OFF | — | $V_{in} < V_{th1}$ |
| SHORT-CIRCUIT FAULT OF M3 | ON | — | OFF | — | $V_{in} < V_{th1}$ |
| SHORT-CIRCUIT FAULT 1 OF D4 | OFF | — | OFF | — | $I_{out} < I_{th1}$ |
| SHORT-CIRCUIT FAULT 2 OF D4 | ON | — | OFF | — | $I_{out} < I_{th1}$ |

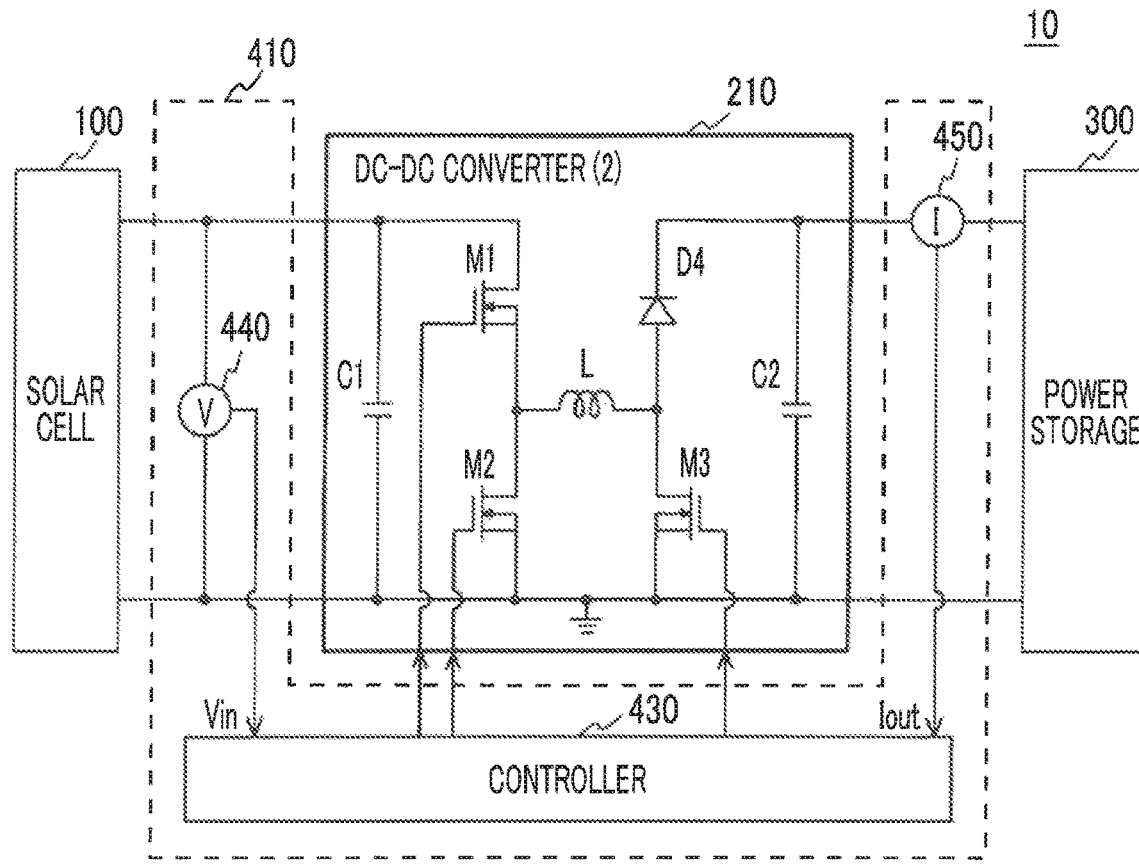

FIG. 3A

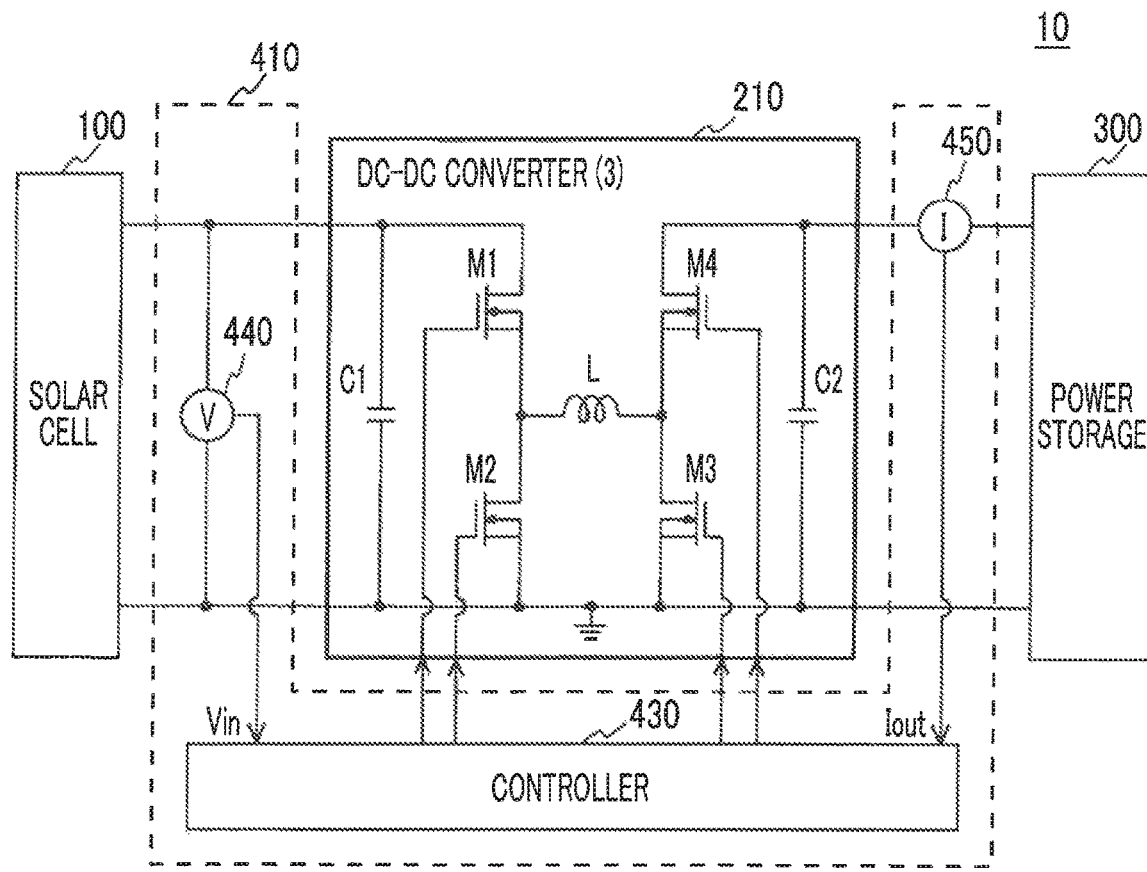

FIG. 3B

| TARGET | STEP-DOWN SIDE | | STEP-UP SIDE | | SHORT-CIRCUIT FAULT DETERMINATION CONDITION |
|---|---|---|---|---|---|
| | M1 | M2 | M3 | D4 | |
| SHORT-CIRCUIT FAULT 1 OF M1 | OFF | OFF | ON | OFF | $V_{in} < V_{th1}$ |
| SHORT-CIRCUIT FAULT 2 OF M1 | OFF | ON | OFF | OFF | $V_{in} < V_{th1}$ |
| SHORT-CIRCUIT FAULT OF M2 | ON | OFF | OFF | OFF | $V_{in} < V_{th1}$ |
| SHORT-CIRCUIT FAULT OF M3 | ON | OFF | OFF | OFF | $V_{in} < V_{th1}$ |
| SHORT-CIRCUIT FAULT 1 OF M4 | OFF | OFF | OFF | OFF | $I_{out} < I_{th1}$ |
| SHORT-CIRCUIT FAULT 2 OF M4 | ON | OFF | OFF | OFF | $I_{out} < I_{th1}$ |

| TARGET | STEP-DOWN SIDE | | STEP-UP SIDE | | SHORT-CIRCUIT FAULT DETERMINATION CONDITION |
|---|---|---|---|---|---|
| | M1 | M2 | — | — | |
| SHORT-CIRCUIT FAULT OF M1 | OFF | ON | — | — | Vin < Vth1 |
| SHORT-CIRCUIT FAULT OF M2 | ON | OFF | — | — | Vin < Vth1 |

SHORT-CIRCUIT FAULT DETECTION DEVICE

INCORPORATION BY REFERENCE

The disclosure of Japanese Patent Application No. 2016-232374 filed on Nov. 30, 2016 including the specification, drawings and abstract is incorporated herein by reference in its entirety.

BACKGROUND

1. Technical Field

The disclosure relates to a device that detects a short-circuit fault of a DC-DC converter used in a solar power generation system.

2. Description of Related Art

A solar power generation system that uses maximum power point tracking (MPPT) to control power generated by a solar cell (solar panel) is disclosed in, for example, Japanese Unexamined Patent Application Publication No. 2015-207238 (JP 2015-207238 A).

SUMMARY

Generally, when an arm constituting a DC-DC converter (a switching element or a rectifier element constituting the arm) causes a short-circuit fault, a current that flows in the DC-DC converter (the arm having a short-circuit fault) is significantly increased. Thus, when an increase in the current (that is, occurrence of a short-circuit current) is appropriately found, the short-circuit fault of the arm (element) can be easily detected.

A solar cell is known to operate as a current source. Thus, in a DC-DC converter that takes generated power of the solar cell as an input as in the solar power generation system disclosed in JP 2015-207238 A, a current that flows in the DC-DC converter is not increased above a value determined by an characteristic of the solar cell even when an arm (element) constituting the DC-DC converter causes a short-circuit fault.

As described above, the DC-DC converter taking the generated power of the solar cell as an input may not detect the short-circuit fault of the arm (element) by determining an increase in the current (occurrence of a short-circuit current).

The present disclosure provides a short-circuit fault detection device that can easily detect the occurrence of a short-circuit fault in a DC-DC converter which takes generated power of a solar cell as an input.

A first aspect of the present disclosure relates to a short-circuit fault detection device that detects a short-circuit fault in a step-up and step-down DC-DC converter which takes generated power of a solar cell as an input and outputs a predetermined voltage to a power storage. The DC-DC converter includes a step-up upper arm, a step-up lower arm, a step-down upper arm, and a step-down lower arm. The short-circuit fault detection device includes a voltage detection unit that detects a voltage output to the DC-DC converter from the solar cell, a current detection unit that detects a current output to the power storage from the DC-DC converter, and a controller configured to control switching elements constituting the DC-DC converter to determine whether or not each arm of the DC-DC converter has a short-circuit fault based on a detected voltage value that is a detected value of the voltage detection unit, and a detected current value that is a detected value of the current detection unit. The controller is configured to determine whether or not the step-down upper arm has a short-circuit fault based on the detected voltage value at a time of controlling a switching element of the step-down upper arm into an OFF state and controlling a switching element used in any one of the step-down lower arm and the step-up lower arm into an ON state. The controller is configured to determine whether or not at least one of the step-down lower arm and the step-up lower arm has a short-circuit fault based on the detected voltage value, at a time of controlling the switching element of the step-down upper arm into the ON state and controlling all switching elements used in the step-down lower arm and the step-up lower arm into the OFF state. The controller is configured to determine whether or not the step-up upper arm has a short-circuit fault based on the detected current value at a time of controlling all switching elements used in the step-down lower arm, the step-up upper arm, and the step-up lower arm into the OFF state.

The first aspect of the present disclosure controls the switching elements constituting the DC-DC converter into the ON/OFF state in accordance with a combination set in advance, in a case of detecting a short-circuit fault in the step-down upper arm element, the step-down lower arm element, and the step-up lower arm element constituting the step-up and step-down DC-DC converter. The combination set in advance forms a short-circuit path in the DC-DC converter when a detection target arm (element) has a short-circuit fault.

The control can cause a voltage on an input terminal side of the DC-DC converter to which the solar cell is connected to be decreased below a predetermined value when the detection target arm (element) has a short-circuit fault. Thus, when the voltage on the input terminal side of the DC-DC converter is detected, a determination as to whether or not the detection target arm (element) has a short-circuit fault can be easily performed based on the detected voltage value.

The first aspect of the present disclosure controls the switching elements constituting the DC-DC converter into the ON/OFF state in accordance with a combination set in advance, in a case of detecting a short-circuit fault in the step-up upper arm element constituting the step-up and step-down DC-DC converter. The combination set in advance forms a reverse current path in the DC-DC converter when the detection target arm (element) has a short-circuit fault.

The control can cause a current on an output terminal side of the DC-DC converter to which the power storage is connected to be decreased below a predetermined value when the detection target arm (element) has a short-circuit fault. Thus, when the current on the output terminal side of the DC-DC converter is detected, a determination as to whether or not the detection target arm (element) has a short-circuit fault can be easily performed based on the detected current value.

In the first aspect of the present disclosure, the controller may be configured to determine whether or not the detected voltage value is smaller than a predetermined voltage value at a time of controlling the switching element of the step-down upper arm into the OFF state and controlling the switching element used in any one of the step-down lower arm and the step-up lower arm into the ON state, and when the detected voltage value is smaller than the predetermined voltage value, determine that the step-down upper arm has a short-circuit fault.

In the first aspect of the present disclosure, the controller may be configured to determine whether or not the detected voltage value is smaller than a predetermined voltage value at a time of controlling the switching element of the step-down upper arm into the ON state and controlling all switching elements used in the step-down lower arm and the step-up lower arm into the OFF state, and when the detected voltage value is smaller than the predetermined voltage value, determine that at least one of the step-down lower arm and the step-up lower arm has a short-circuit fault.

In the first aspect of the present disclosure, the controller may be configured to determine Whether or not the detected current value is smaller than a predetermined current value at a time of controlling all switching elements used in the step-down lower arm, the step-up upper arm, and the step-up lower arm into the OFF state, and when the detected current value is smaller than the predetermined current value, determine that the step-up upper arm has a short-circuit fault.

A second aspect of the present disclosure relates to a short-circuit hull detection device that detects a short-circuit fault in a step-down DC-DC converter which takes generated power of a solar cell as an input and outputs a predetermined voltage. The DC-DC converter includes an upper arm and a lower arm. The short-circuit fault detection device includes a voltage detection unit that detects a voltage output to the DC-DC converter from the solar cell, and a controller configured to controls switching elements constituting the DC-DC converter to determine whether or not each arm of the DC-DC converter has a short-circuit fault based on a detected voltage value that is a detected value of the voltage detection unit. The controller is configured to determine whether or not the upper arm has a short-circuit fault based on the detected voltage value at a time of controlling a switching element of the upper arm into an OFF state and controlling a switching element of the lower arm into an ON state. The controller is configured to determine whether or not the lower arm has a short-circuit fault based on the detected voltage value at a time of controlling the switching element of the upper arm into the ON state and controlling the switching element of the lower arm into the OFF state.

The second aspect of the present disclosure controls the switching elements constituting the DC-DC converter into the ON/OFF state in accordance with a combination set in advance, in a case of detecting a short-circuit fault in the switching elements of the upper arm and the lower arm in the step-down DC-DC converter. The combination set in advance forms a short-circuit path in the DC-DC converter when the detection target constituent element has a short-circuit fault.

The control can cause a voltage on an input terminal side of the DC-DC converter to which the solar cell is connected to be decreased below a predetermined value when the detection target arm (element) has a short-circuit fault. Thus, when the voltage on the input terminal side of the DC-DC converter is detected, a determination as to whether or not the detection target arm (element) has a short-circuit fault can be easily performed based on the detected voltage value.

In the second aspect of the present disclosure, the controller may be configured to determine Whether or not the detected voltage value is smaller than a predetermined voltage value at a time of controlling the switching element of the upper arm into the OFF state and controlling the switching element of the lower area into the ON state, and when the detected voltage value is smaller than the predetermined voltage value, determine that the upper arm has a short-circuit fault.

In the second aspect of the present disclosure, the controller may be configured to determine whether or not the detected voltage value is smaller than a predetermined voltage value at a time of controlling the switching element of the upper arm into the ON state and controlling the switching element of the lower arm into the OFF state, and when the detected voltage value is smaller than the predetermined voltage value, determine that the lower arm has a short-circuit fault.

The short-circuit fault detection device according to the aspects of the present disclosure can easily detect the occurrence of a short-circuit fault in a DC-DC converter that takes generated power of a solar cell as an input.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a configuration example of the solar power generation system to Which the short-circuit fault detection device according to the first embodiment of the present disclosure is applied (DC-DC converter (2));

FIG. 2B is a descriptive diagram of a method of determining an element short-circuit fault performed by the short-circuit fault detection device in FIG. 2A;

FIG. 3A is a configuration example of the solar power generation system to which the short-circuit fault detection device according to the first embodiment of the present disclosure is applied (DC-DC converter (3));

FIG. 3B is a descriptive diagram of a method of determining an element short-circuit fault performed by the short-circuit fault detection device in FIG. 3A;

DETAILED DESCRIPTION OF EMBODIMENTS

A short-circuit fault detection device of the present disclosure controls switching elements into an ON/OFF state in a combination that forms a short-circuit path in a DC-DC converter at the time of a short-circuit fault of a target arm (element), in the case of detecting a short-circuit fault in a step-down upper arm element, a step-down lower arm element, and a step-up lower arm element in the DC-DC converter to which a solar cell is connected. The control changes a voltage on an input terminal side of the DC-DC converter to which the solar cell is connected, when the target arm (element) has a short-circuit fault. Thus, a determination as to whether or not the target arm (element) has a short-circuit fault can be performed based on the voltage detected on the input terminal side.

First Embodiment

Figures 1A, 1B:
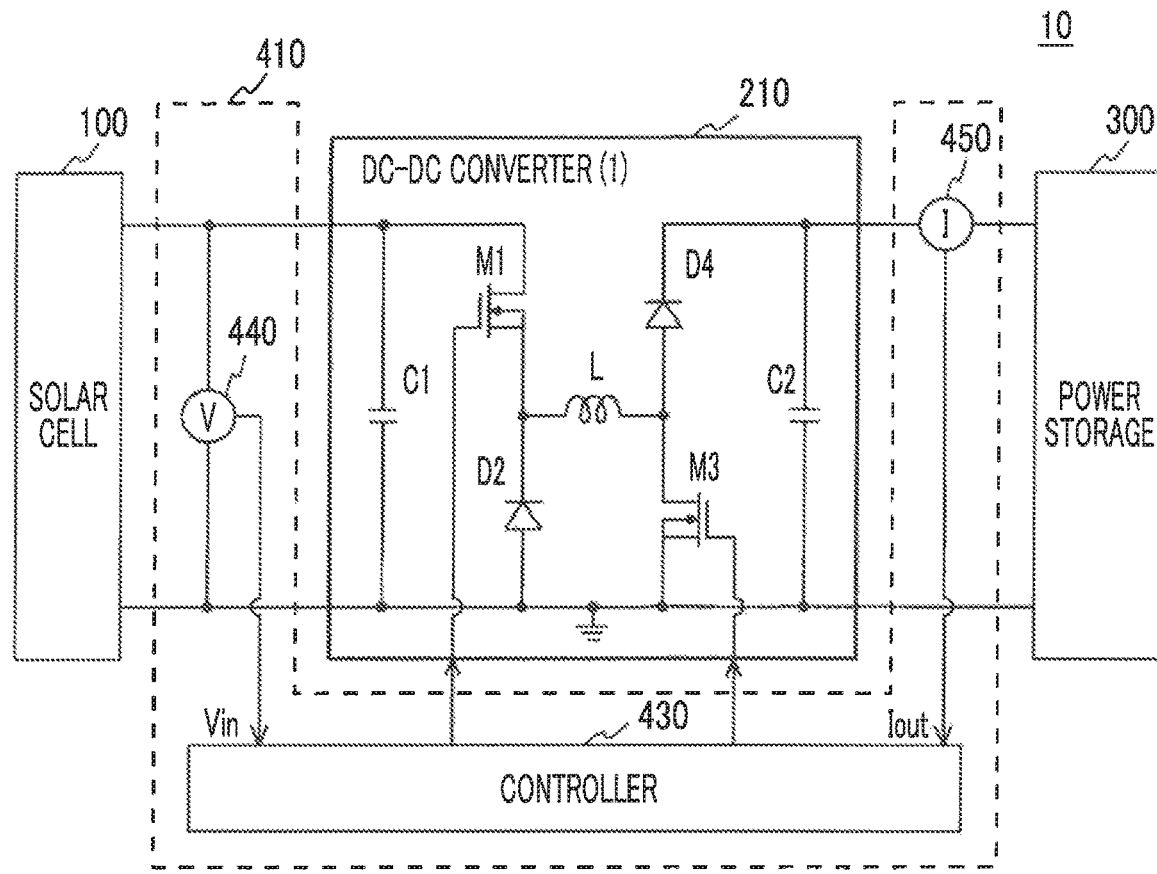
FIG. 1A is a configuration example of a solar power generation system to which a short-circuit fault detection device according to a first embodiment of the present disclosure is applied (DC-DC converter (1))
FIG. 1B is a descriptive diagram of a method of determining an element short-circuit fault performed by the short-circuit fault detection device in FIG. 1A.

FIG. 1A, FIG. 2A, and FIG. 3A are diagrams illustrating configuration examples of a solar power generation system 10 to which a short-circuit fault detection device 410 according to a first embodiment of the present disclosure is applied. The solar power generation system 10 illustrated in each of FIG. 1A, FIG. 2A, and FIG. 3A is configured to include a solar cell 100, a step-up and step-down DC-DC converter 210, a power storage 300, and the short-circuit-fault detection device 410. The DC-DC converter 210 in each of FIG. 1A, FIG. 2A, and FIG. 3A has different constituent elements as described below.

The short-circuit fault detection device 410 according to the present embodiment is a device that detects a short-circuit fault in the step-up and step-down DC-DC converter 210 which takes generated power of the solar cell 100 as an input and outputs a predetermined voltage to the power storage 300. The short-circuit fault detection device 410 includes a controller 430, a voltage detection unit 440, and a current detection unit 450.

Output terminals of the solar cell 100 are connected to input terminals of the DC-DC converter 210. The voltage detection unit 440 is connected between a positive electrode side output terminal and a negative electrode side output terminal of the solar cell 100. A positive electrode side output terminal of the DC-DC converter 210 is connected to an input terminal of the power storage 300 through the current detection unit 450. The controller 430 is connected to the DC-DC converter 210, the voltage detection unit 440, and the current detection unit 450.

The solar cell 100 is a solar power generation device that generates power by being irradiated with sunlight. The solar cell 100 is a solar cell module such as a solar panel. The solar cell 100 outputs the acquired generated power to the DC-DC converter 210.

The voltage detection unit 440 is configured with, for example, a voltage sensor. The voltage detection unit 440 is disposed to detect a voltage corresponding to the generated power that is output to the DC-DC converter 210 from the solar cell 100. The voltage detected by the voltage detection unit 440 is output as a detected voltage value Vin to the controller 430.

The current detection unit 450 is configured with, for example, a current sensor. The current detection unit 450 is disposed to detect a current that is output to the power storage 300 from the DC-DC converter 210. The current detected by the current detection unit 450 is output as a detected current value Iout to the controller 430.

The power storage 300 is a battery that is configured to be rechargeable, such as a lead-acid battery and a nickel-hydrogen battery, The controller 430 is configured with, for example, a microcomputer. The controller 430 can execute various types of control in the solar power generation system 10. As one example of the types of control, the controller 430 controls the switching elements constituting the DC-DC converter 210 to detect the presence of a short-circuit fault in each arm (element) of the DC-DC converter 210 based on the detected values output by the voltage detection unit 440 and the current detection unit 450 (the detected voltage value Vin and the detected current value Iout).

A short-circuit fault of the arm (element) is detected based on a determination method that corresponds to the content of an element configuration of the step-up and step-down DC-DC converter 210. Hereinafter, short-circuit fault detection executed by the controller 430 will be described in three element configuration examples of the step-up and step-down DC-DC converter 210.

1. DC-DC Converter (1)

1-1. Configuration

A configuration of a DC-DC converter (1) illustrated in FIG. 1A includes a capacitor C1, a switching element M1 that is a step-down upper arm element, a rectifier element D2 that is a step-down lower arm element, an inductor L, a switching element M3 that is a step-up lower arm element, a rectifier element D4 that is a step-up upper arm element, and a capacitor C2.

The switching elements M1, M3 are active elements that can be controlled to be switched into the ON/OFF state by the controller 430. The switching elements M1, M3 are, for example, transistors. The switching elements M1, M3 can cause a current to flow in one direction when the switching elements M1, M3 are controlled into the ON state. For example, metal oxide semiconductor field effect transistors (MOSFET) can be used as the transistors as illustrated in FIG. 1A.

The rectifier elements D2, D4 are active elements that can cause a current to flow in one direction. The rectifier elements D2, D4 are, for example, diodes. For example, Schottky barrier diodes can be used as the diodes.

The capacitors C1, C2 are passive elements that can store or discharge electrical energy (charge). The capacitors C1, C2 absorb and smooth out variations in voltage.

The inductor L is a passive element that can generate a magnetic field by a current flowing therein and store magnetic energy. The inductor L has a constant current characteristic such that the current does not change. For example, a choke coil can be used in the inductor L.

A source of the switching element M1 is connected to the positive electrode output terminal of the solar cell 100. A drain of the switching element M1 is connected to a cathode of the rectifier element D2. An anode of the rectifier element D2 is connected to the negative electrode output terminal of the solar cell 100. A gate of the switching element M1 is connected to the controller 430. The capacitor C1 is connected between the input terminals of the DC-DC converter 210. A cathode of the rectifier element D4 is connected to a positive electrode input terminal of the power storage 300. An anode of the rectifier element D4 is connected to a source of the switching element M3. A drain of the switching element M3 is connected to a negative electrode input terminal of the power storage 300. A gate of the switching element M3 is connected to the controller 430. The capacitor C2 is connected between output terminals of the DC-DC converter 210. The inductor L is inserted between a connection point of the drain of the switching element M1 and the cathode of the rectifier element D2 and a connection point of the anode of the rectifier element D4 and the source of the switching element M3.

The DC-DC converter (1) forms a step-down circuit by the switching element M1, the rectifier element D2, and the inductor L. The step-down circuit steps down the output voltage from the solar cell 100 and outputs the stepped-down voltage to the power storage 300. The DC-DC converter (1) forms a step-up circuit by the inductor L, the switching element M3, and the rectifier element D4. The step-up circuit steps up the output voltage from the solar cell 100 and outputs the stepped-up voltage to the power storage 300.

1-2. Control and Determination

FIG. 1B illustrates a method of control and determination performed by the controller 430 for the DC-DC converter (1) illustrated in FIG. 1A. For each target arm (element) on which the short-circuit fault determination is performed, FIG. 1B illustrates a state where the switching elements M1, M3 are controlled into the ON/OFF state (combination), and a short-circuit fault determination condition that is based on the detected voltage value Vin of the voltage detection unit 440 and the detected current value Iout of the current detection unit 450.

A determination as to the presence of a short-circuit fault in the step-down upper arm (switching element M1) is performed based on the detected voltage value Vin of the voltage detection unit 440 at the time of controlling the switching element M1 into the "OFF" state (applying an OFF voltage to the gate of the switching element M1) and controlling the switching element M3 into the "ON" state (applying an ON voltage to the gate of the switching element M3). The switching elements are controlled into the ON/OFF state such that a short-circuit path is formed in the DC-DC converter (1) when the detection target arm (element) has a short-circuit fault.

In the control state, a current does not flow between the source and the drain of the switching element M1 when the step-down upper arm (switching element M1) does not have a short-circuit fault. Thus, the detected voltage value Vin of the voltage detection unit 440 is equal to the voltage output from the solar cell 100, for example, a voltage VMPP at the maximum power point (MPP). When, for example, the step-down upper arm (switching element M1) has a short-circuit fault causing a flow of current between the source and the drain of the step-down upper arm (switching element M1), the detected voltage value Vin of the voltage detection unit 440 is decreased to a short-circuit voltage Vs described below.

By using the phenomenon, when a voltage threshold Vth1 is optimally set in advance between the maximum power point voltage VMPP and the short-circuit voltage Vs, a determination as to whether or not the step-down upper arm (switching element M1) has a short-circuit fault can be performed by determining whether or not the detected voltage value Vin of the voltage detection unit 440 is less than the voltage threshold Vth1. That is, a determination as to whether or not the step-down upper arm (switching element M1) has a short-circuit fault can be easily performed based on the detected voltage value Vin of the voltage detection unit 440.

A determination as to the presence of a short-circuit fault in the step-down lower arm (rectifier element D2) is performed based on the detected voltage value Vin of the voltage detection unit 440 at the time of controlling the switching element M1 into the "ON" state and controlling the switching element M3 into the "OFF" state. Similarly, a determination as to the presence of a short-circuit fault in the step-up lower arm (switching element M3) is performed based on the detected voltage value Vin of the voltage detection unit 440 at the time of controlling the switching element M1 into the "ON" state and controlling the switching element M3 into the "OFF" state. The switching elements are controlled into the ON/OFF state such that a short-circuit path is formed in the DC-DC converter (1) when the detection target arm (element) has a short-circuit fault.

In the control state, a current does not flow in the switching element M1 when both of the step-down lower arm (rectifier element D2) and the step-up lower arm (switching element M3) do not have a short-circuit fault. Thus, the detected voltage value Vin of the voltage detection unit 440 is equal to the voltage output from the solar cell 100, for example, the maximum power point voltage VMPP. When, for example, the step-down lower arm (rectifier element D2) has a short-circuit fault causing a flow of current between the cathode and the anode of the step-down lower arm (rectifier element D2), and/or when the step-up lower arm (switching element M3) has a short-circuit fault causing a flow of current between the source and the drain of the step-down lower arm (switching element M3), the detected voltage value Vin of the voltage detection unit 440 is decreased to the short-circuit voltage Vs described below.

By using the phenomenon, when the voltage threshold Vth1 is optimally set in advance between the maximum power point voltage VMPP and the short-circuit voltage Vs, a determination as to whether or not at least one of the step-down lower arm (rectifier element D2) and the step-up lower arm (switching element M3) has a short-circuit fault can be performed by determining whether or not the detected voltage value Vin of the voltage detection unit 440 is less than the voltage threshold Vth1. That is, a determination as to whether or not at least one of the step-down lower arm (rectifier element D2) and the step-up lower arm (switching element M3) has a short-circuit fault can be easily performed based on the detected voltage value Vin of the voltage detection unit 440.

A method of setting the voltage threshold Vth1 will be described. An I-V characteristic of the solar cell 100 changes as illustrated by, for example, a solid line in FIG. 5. When, for example, a circuit resistance value at the time of a short-circuit fault in the step-down upper arm (switching element M1), that is, a resistance value between the switching element M1 and the switching element M3 through the inductor L, is denoted by "R", an operating line of the solar cell 100 of a current source at the time of the short-circuit fault can be represented as "I=(1/R)V" as illustrated by, for example, a dot-dashed line in FIG. 5. Accordingly, a voltage at the point of intersection between the I-V characteristic line and the operating line "I=(1/R)V" of the solar cell 100, that is, the short-circuit voltage Vs, is acquired as the detected voltage value Vin that is detected by the voltage detection unit 440 at the time of the short-circuit fault.

Figure 5:
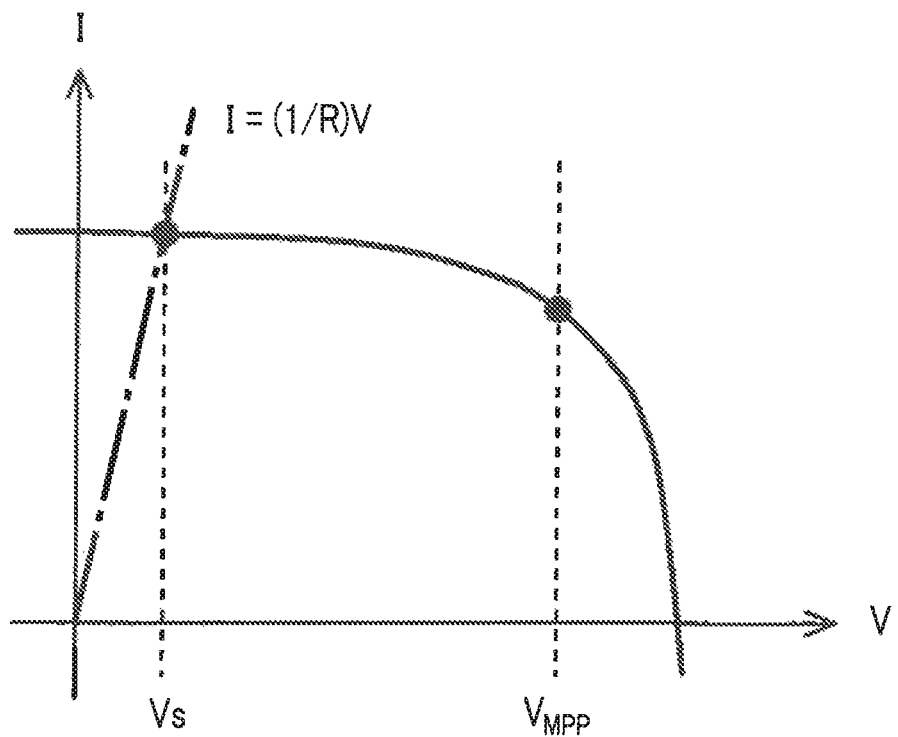
FIG. 5 is a diagram illustrating one example of an I-V characteristic of a solar cell.

The short-circuit voltage Vs is sufficiently lower than the maximum power point voltage VMPP as illustrated in. FIG. 5. Thus, the voltage threshold Vth1 is set as an appropriate value that is acquired by adding a designed margin α to the short-circuit voltage Vs which is expected to be applied between the input terminals of the DC-DC converter (1) at the time of the short-circuit fault (Vs+α<Vth1<VMPP). Accordingly, a determination as to whether or not the step-down upper arm (switching element M1), the step-down lower arm (rectifier element D2), or the step-up lower arm (switching element M3) has a short-circuit fault can be performed by determining whether or not the detected voltage value Vin of the voltage detection unit 440 is less than the voltage threshold Vth1.

The step-up upper arm (rectifier element D4) is connected to the power storage 300 that does not have a GND electric potential. Thus, fault detection based on a decrease in voltage by forming a short-circuit path as in the other arms (elements) cannot be performed for the step-up upper arm (rectifier element D4). Therefore, a determination as to the presence of a short-circuit fault in the step-up upper arm (rectifier element D4) is performed based on the detected current value Iout of the current detection unit 450 at the time of controlling the switching element M3 into the "OFF" state. The switching elements are controlled into the ON/OFF state such that a reverse current path is formed in the DC-DC converter (1) when the detection target arm (element) has a short-circuit fault.

The switching element M1 may be controlled into the "ON" state or the "OFF" state. When the switching element M1 is controlled into the "ON" state, a reverse current flows through a path from the drain to the source of the switching element M1. When the switching element M1 is controlled into the "OFF" state, a reverse current flows via a parasitic diode included in the MOSFET.

In the control state, a reverse current does not flow to the solar cell 100 side from the power storage 300 when the step-up upper arm (rectifier element D4) does not have a short-circuit fault. Thus, the detected current value Iout of the current detection unit 450 is equal to the high current supplied from the DC-DC converter (1). When, for example, the step-up upper arm (rectifier element D4) has a short-circuit fault causing a flow of current between the cathode and the anode of the step-up upper arm (rectifier element D4), a reverse current flows to the solar cell 100 side from the power storage 300 via the rectifier element D4, the inductor L, and the switching element M1. Thus, the detected current value Iout of the current detection unit 450 is decreased by a value corresponding to the reverse current from the current supplied from the DC-DC converter (1).

By using the phenomenon, when a current threshold Ith1 is optimally set in advance between the high current value supplied from the DC-DC converter (1) and the current value acquired by subtracting the current flowing as the reverse current from the high current value supplied from the DC-DC converter (1), a determination as to whether or not the step-up upper arm (rectifier element D4) has a short-circuit fault can be performed by determining whether or not the detected current value Iout of the current detection unit 450 is less than the current threshold Ith1. That is, a determination as to whether or not the step-up upper arm (rectifier element D4) has a short-circuit fault can be easily performed based on the detected current value Iout of the current detection unit 450.

A method of setting the current threshold Ith1 will be described. When the current that is typically supplied to the power storage 300 from the DC-DC converter (1) is denoted by Istd, the current threshold Ith1 is set as an appropriate value that is acquired by adding the designed margin α to "Istd−Irev" which is a value acquired by subtracting, from the current Istd, a reverse current Irev which is expected to flow in the step-up upper arm (rectifier element D4) at the time of a short-circuit fault (Istd−Irev+α<Ith1<Istd). Accordingly, a determination as to whether or not the step-up upper arm (rectifier element D4) has a short-circuit fault can be performed by determining whether or not the detected current value Iout of the current detection unit 450 is less than the current threshold Ith1.

Figure 6:
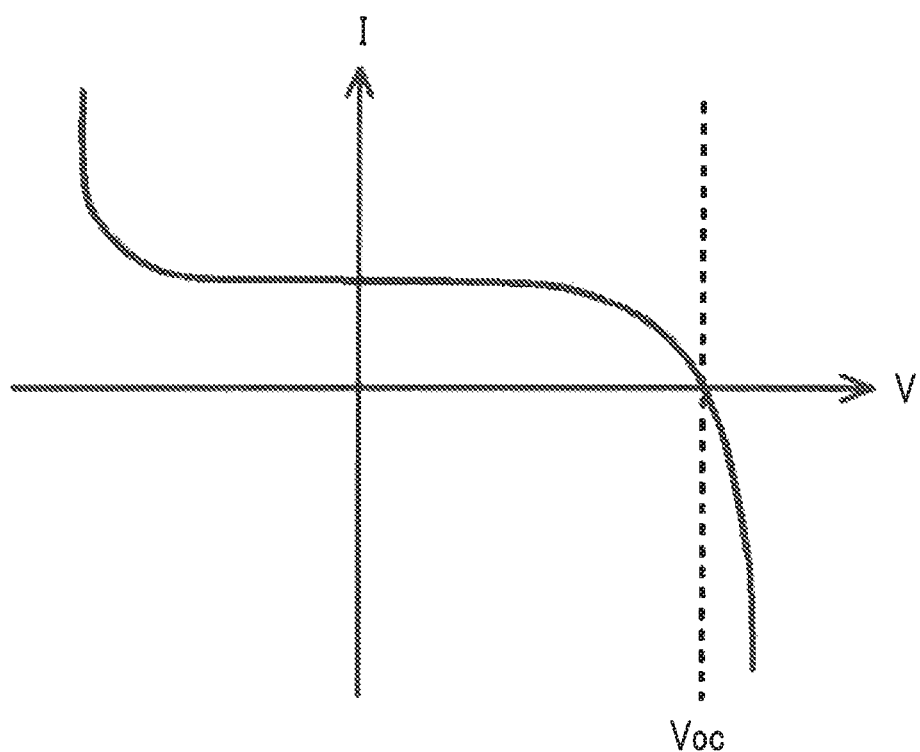
FIG. 6 is a diagram illustrating one example of an open-circuit voltage of the solar cell.

An open-circuit voltage Voc of the solar cell 100 (refer to FIG. 6) is set to be higher than the voltage of the power storage 300 in order to prevent a flow of a large current without a restriction on the current.

2. DC-DC Converter (2)

2-1. Configuration

A configuration of a DC-DC converter (2) illustrated in FIG. 2A includes the capacitor C1, the switching element M1 that is a step-down upper arm element, a switching element M2 that is a step-down lower arm element, the inductor L, the switching element M3 that is a step-up lower arm element, the rectifier element D4 that is a step-up upper arm element, and the capacitor C2.

The DC-DC converter (2) illustrated in FIG. 2A is configured by changing the step-down lower arm element in the DC-DC converter (1) illustrated in FIG. 1A from the rectifier element D2 to the switching element M2. Hereinafter, a difference in operation from the DC-DC converter (1) due to the change in the step-down lower arm element will be described.

Like the switching elements M1, M3, the switching element M2 is an active element that can be controlled to be switched into the ON/OFF state by the controller 430. The switching element M2 is a transistor such as a MOSFET.

The source of the switching element M1 is connected to the positive electrode output terminal of the solar cell 100. The drain of the switching element M1 is connected to a source of the switching element M2. A drain of the switching element M2 is connected to the negative electrode output terminal of solar cell 100. The cathode of the rectifier element D4 is connected to a positive electrode input terminal of the power storage 300. The anode of the rectifier element D4 is connected to the source of the switching element M3. The drain of the switching element M3 is connected to the negative electrode input terminal of the power storage 300. Gates of the switching elements M1, M2, M3 are connected to the controller 430. The inductor L is inserted between a connection point of the drain of the switching element M1 and the source of the switching element M2 and the connection point of the anode of the rectifier element D4 and the source of the switching element M3.

The DC-DC converter (2) forms a step-down circuit by the switching element M1, the switching element M2, and the inductor L. The step-down circuit steps down the output voltage from the solar cell 100 and outputs the stepped-down voltage to the power storage 300. The DC-DC converter (2) forms a step-up circuit by the inductor L, the switching element M3, and the rectifier element D4. The step-up circuit steps up the output voltage from the solar cell 100 and outputs the stepped-up voltage to the power storage 300.

2-2. Control and Determination

FIG. 2B illustrates a method of control and determination performed by the controller 430 for the DC-DC converter (2) illustrated in FIG. 2A. For each target arm (element) on which the short-circuit fault determination is performed, FIG. 2B illustrates a state where the switching elements M1, M2, M3 are controlled into the ON/OFF state (combination), and a short-circuit fault determination condition that is based on the detected voltage value Vin of the voltage detection unit 440 and the detected current value Iout of the current detection unit 450.

A determination as to the presence of a short-circuit fault in the step-down upper arm (switching element M1) is performed based on the detected voltage value Vin of the voltage detection unit 440 at the time of controlling the switching element M1 into the "OFF" state and controlling any one of the switching elements M2, M3 into the "ON" state. The switching elements are controlled into the ON/OFF state such that a short-circuit path is formed in the DC-DC converter (2) when the detection target arm (element) has a short-circuit fault.

In the control state, a current does not flow in the switching element M1 when the step-down upper arm (switching element M1) does not have a short-circuit fault. Thus, the detected voltage value Vin of the voltage detection unit 440 is equal to, for example, the maximum power point voltage VMPP output from the solar cell 100. When, for example, the step-down upper arm (switching element MD has a short-circuit fault causing a flow of current therein, the detected voltage value Vin of the voltage detection unit 440 is decreased to the short-circuit voltage Vs. Thus, a determination as to whether or not the step-down upper arm (switching element M1) has a short-circuit fault can be performed by determining whether or not the detected voltage value Vin of the voltage detection unit 440 is less than the voltage threshold Vth1. That is, a determination as to whether or not the step-down upper arm (switching element M1) has a short-circuit fault can be easily performed based on the detected voltage value Vin of the voltage detection unit 440.

A determination as to the presence of a short-circuit fault in the step-down lower arm (switching element M2) and the step-up lower arm (switching element M3) is performed based on the detected voltage value Vin of the voltage detection unit 440 at the time of controlling the switching element M1 into the "ON" state and controlling both of the switching elements M2, M3 into the "OFF" state. The switching elements are controlled into the ON/OFF state such that a short-circuit path is thrilled in the DC-DC converter (2) when the detection target arm (element) has a short-circuit fault.

In the control state, a current does not flow in the switching element M1 when both of the step-down lower arm (switching element M2) and the step-up lower arm (switching element M3) do not have a short-circuit fault. Thus, the detected voltage value Vin of the voltage detection unit 440 is equal to, for example, the maximum power point voltage VMPP output from the solar cell 100. When, for example, the step-down lower arm (switching element M2) and/or the step-up lower arm (switching element M3) has a short-circuit fault causing a flow of current therein, the detected voltage value Vin of the voltage detection unit 440 is decreased to the short-circuit voltage Vs. Thus, a determination as to whether or not at least one of the step-down lower arm (switching element M2) and the step-up lower arm (switching element M3) has a short-circuit fault can be performed by determining whether or not the detected voltage value Vin of the voltage detection unit 440 is less than the voltage threshold Vth1. That is, a determination as to whether or not at least one of the step-down lower arm (switching element M2) and the step-up lower arm (switching element M3) has a short-circuit fault can be easily performed based on the detected voltage value Vin of the voltage detection unit 440.

A determination as to the presence of a short-circuit fault in the step-up upper arm (rectifier element D4) is performed based on the detected current value Iout of the current detection unit 450 at the time of controlling both of the switching elements M2, M3 into the "OFF" state. The switching elements are controlled into the ON/OFF state such that a reverse current path is formed in the DC-DC converter (2) when the detection target arm (element) has a short-circuit fault.

In the control state, when the step-up upper arm (rectifier element D4) has a short-circuit fault causing a flow of current therein, a reverse current flows to the solar cell 100 side from the power storage 300 via the rectifier element D4, the inductor L, and the switching element M1, and the current supplied from the DC-DC converter (2) is decreased. Thus, a determination as to whether or not the step-up upper arm (rectifier element D4) has a short-circuit fault can be performed by determining whether or not the detected current value Iout of the current detection unit 450 is less than the current threshold Ith1. That is, a determination as to whether or not the step-up upper arm (rectifier element D4) has a short-circuit fault can be easily performed based on the detected current value Iout of the current detection unit 450.

3. DC-DC Converter (3)

3-1. Configuration

A configuration of a DC-DC converter (3) illustrated in FIG. 3A includes the capacitor C1, the switching element 111 that is a step-down upper arm element, the switching element M2 that is a step-down lower arm element, the inductor L, the switching element M3 that is a step-up lower arm element, a switching element M4 that is a step-up upper arm element, and the capacitor C2.

The DC-DC converter (3) illustrated in FIG. 3A is configured by changing the step-up upper arm element in the DC-DC converter (2) illustrated in FIG. 2A from the rectifier element D4 to the switching element M4. Hereinafter, a difference in operation from the DC-DC converters (1), (2) due to the change in the step-up upper am element will be described.

Like the switching elements M1, M2, M3, the switching element M4 is an active element that can be controlled to be switched into the ON/OFF state by the controller 430. The switching element M4 is a transistor such as a MOSFET.

The source of the switching element M1 is connected to the positive electrode output terminal of the solar cell 100. The drain of the switching element M1 is connected to the source of the switching element M2. The drain of the switching element M2 is connected to the negative electrode output terminal of solar cell 100. A source of the switching element M4 is connected to the positive electrode input terminal of the power storage 300. A drain of the switching element M4 is connected to the source of the switching element M3. The drain of the switching element M3 is connected to the negative electrode input terminal of the power storage 300. Gates of the switching elements M1, M2, M3, M4 are connected to the controller 430. The inductor L is inserted between the connection point of the drain of the switching element M1 and the source of the switching element M2 and a connection point of the drain of the switching element M4 and the source of the switching element M3.

The DC-DC converter (3) forms a step-down circuit by the switching element M1, the switching element M2, and the inductor L. The step-down circuit steps down the output voltage from the solar cell 100 and outputs the stepped-down voltage to the power storage 300. The DC-DC converter (3) forms a step-up circuit by the inductor L, the switching element M3, and the switching element M4. The step-up circuit steps up the output voltage from the solar cell 100 and outputs the stepped-up voltage to the power storage 300.

3-2. Control and Determination

FIG. 3B illustrates a method of control and determination performed by the controller 430 for the DC-DC converter (3) illustrated in FIG. 3A. For each target arm (element) on which the short-circuit fault determination is performed, FIG. 3B illustrates a state where the switching elements M1, M2, M3, M4 are controlled into the ON/OFF state (combination), and a short-circuit fault determination condition that is based on the detected voltage value Vin of the voltage detection unit 440 and the detected current value Iout of the current detection unit 450.

A determination as to the presence of a short-circuit fault in the step-down upper arm (switching element M1) is performed based on the detected voltage value Vin of the voltage detection unit 440 at the time of controlling both of the switching elements M1, M4 into the "OFF" state and controlling any one of the switching elements M2, M3 into the "ON" state. The switching elements are controlled into the ON/OFF state such that a short-circuit path is formed in the DC-DC converter (3) when the detection target arm (element) has a short-circuit fault.

In the control state, a current does not flow in the switching element M1 when the step-down upper arm (switching element M1) does not have a short-circuit fault. Thus, the detected voltage value Vin of the voltage detection unit 440 is equal to, for example, the maximum power point voltage VMPP output from the solar cell 100. When, for example, the step-down upper arm (switching element M1) has a short-circuit fault causing a flow of current therein, the detected voltage value Vin of the voltage detection unit 440 is decreased to the short-circuit voltage Vs. Thus, a determination as to whether or not the step-down upper arm (switching element M1) has a short-circuit fault can be performed by determining whether or not the detected voltage value Vin of the voltage detection unit 440 is less than the voltage threshold Vth1. That is, a determination as to whether or not the step-down upper arm (switching element M1) has a short-circuit fault can be easily performed based on the detected voltage value Vin of the voltage detection unit 440.

A determination as to the presence of a short-circuit fault in the step-down lower arm (switching element M2) and the step-up lower arm (switching element M3) is performed based on the detected voltage value Vin of the voltage detection unit 440 at the time of controlling the switching element M1 into the "ON" state and controlling all of the switching elements M2, M3, M4 into the "OFF" state. The switching elements are controlled into the ON/OFF state such that a short-circuit path is formed in the DC-DC converter (3) when the detection target arm (element) has a short-circuit fault.

In the control state, a current does not flow in the switching element M1 when both of the step-down lower arm (switching element M2) and the step-up lower arm (switching element M3) do not have a short-circuit fault. Thus, the detected voltage value Vin of the voltage detection unit 440 is equal to, for example, the maximum power point voltage VMPP output from the solar cell 100. When, for example, the step-down lower arm (switching element M2) and/or the step-up lower arm (switching element M3) has a short-circuit fault causing a flow of current therein, the detected voltage value Vin of the voltage detection unit 440 is decreased to the short-circuit voltage Vs. Thus, a determination as to whether or not at least one of the step-down lower arm (switching element M2) and the step-up lower arm (switching element M3) has a short-circuit fault can be performed by determining whether or not the detected voltage value Vin of the voltage detection unit 440 is less than the voltage threshold Vth1. That is, a determination as to whether or not at least one of the step-down lower (switching element M2) and the step-up lower arm (switching element M3) has a short-circuit fault can be easily performed based on the detected voltage value Vin of the voltage detection unit 440.

A determination as to the presence of a short-circuit fault in the step-up upper arm (switching element M4) is performed based on the detected current value Iout of the current detection unit 450 at the time of controlling all of the switching elements M2. M3, M4 into the "OFF" state. The switching elements are controlled into the ON/OFF state such that a reverse current path is formed in the DC-DC converter (3) when the detection target arm (element) has a short-circuit fault.

In the control state, when the step-up upper arm (switching element M4) has a short-circuit fault causing a flow of current therein, a reverse current flows to the solar cell 100 side from the power storage 300 via the switching element M4, the inductor L, and the switching element M1, and the current supplied from the DC-DC converter (3) is decreased. Thus, a determination as to whether or not the step-up upper arm (switching element M4) has a short-circuit fault can be performed by determining whether or not the detected current value Iout of the current detection unit 450 is less than the current threshold Ith1. That is, a determination as to whether or not the step-up upper arm (switching element M4) has a short-circuit fault can be easily performed based on the detected current value Iout of the current detection unit 450.

Action and Effect in First Embodiment

The short-circuit fault detection device 410 according to the first embodiment of the present disclosure controls the switching elements constituting the DC-DC converter 210 into the ON/OFF state in combinations that form a short-circuit path in the DC-DC converter 210 at the time of a short-circuit fault of the detection target arm (element), in the case of detecting a short-circuit fault in the step-down upper arm element, the step-down lower arm element, and the step-up lower arm element constituting the step-up and step-down DC-DC converter 210.

The control can cause the voltage value Vin on the input terminal side of the DC-DC converter 210 to which the solar cell 100 is connected to be decreased below the preset voltage threshold VIM when the detection target arm (element) has a short-circuit fault. Thus, when the voltage value Vin on the input terminal side of the DC-DC converter 210 is detected, a determination as to whether or not the detection target arm (element) has a short-circuit fault can be easily performed based on the detected voltage value Vin.

The short-circuit fault detection device 410 according to the first embodiment of the present disclosure controls the switching elements constituting the DC-DC converter 210 into the ON/OFF state such that a reverse current path is formed in the DC-DC converter 210 at the time of a short-circuit fault of the detection target arm (element), in the case of having the step-up upper arm element constituting the step-up and step-down DC-DC converter 210 as a detection target.

The control can cause the current value Iout on the output terminal side of the DC-DC converter 210 to which the power storage 300 is connected to be decreased below the preset current threshold Ith1 when the detection target arm (element) has a short-circuit fault. Thus, when the current value Iout on the output terminal side of the DC-DC converter 210 is detected, a determination as to whether or not the detection target arm (element) has a short-circuit fault can be easily performed based on the detected current value Iout.

Second Embodiment

Figures 4A, 4B:
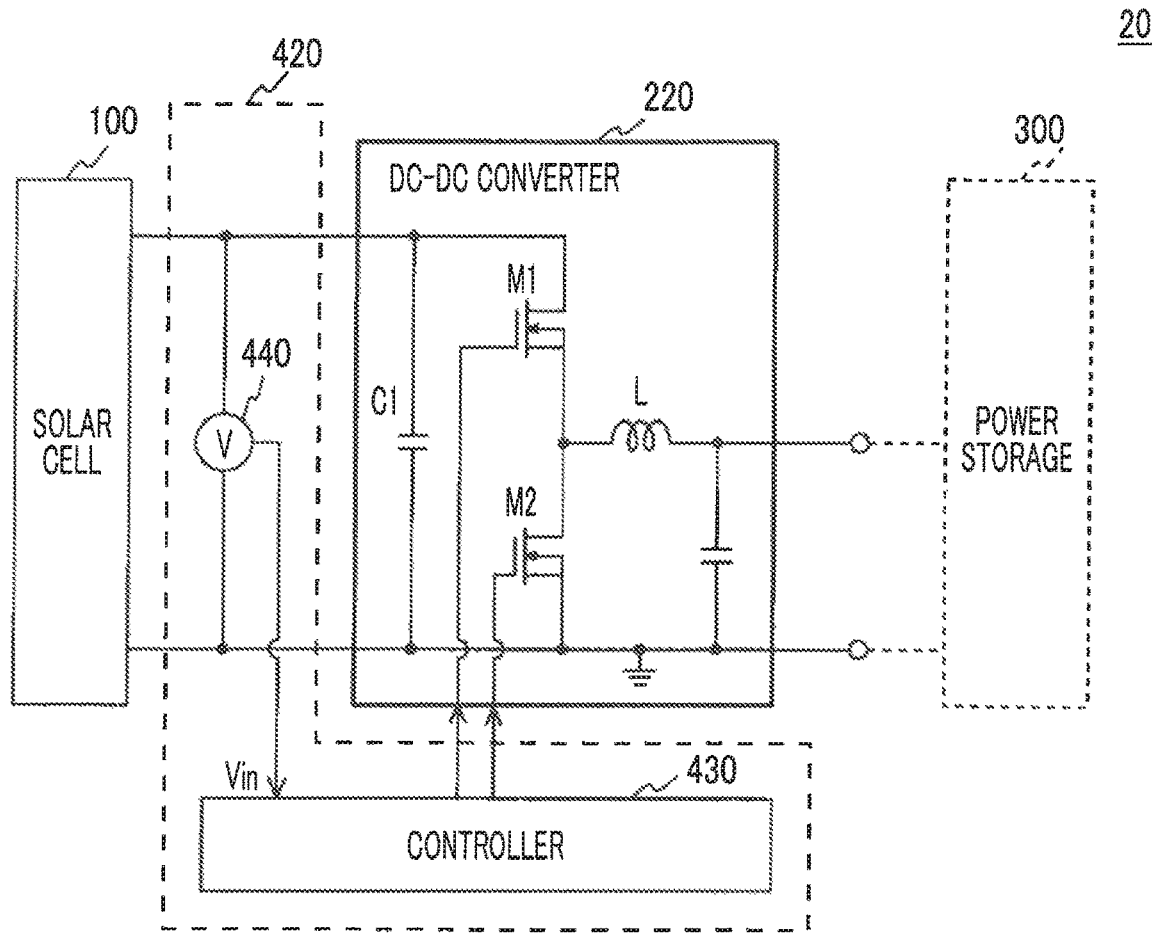
FIG. 4A is a configuration example of a solar power generation system to which a short-circuit fault detection device according to a second embodiment of the present disclosure is applied.
FIG. 4B is a descriptive diagram of a method of determining an element short-circuit fault performed by the short-circuit fault detection device in FIG. 4A.

FIG. 4A is a diagram illustrating a configuration example of a solar power generation system 20 to which a short-circuit fault detection device 420 according to a second embodiment of the present disclosure is applied. The solar power generation system 20 illustrated in FIG. 4A is configured to include the solar cell 100, a step-down DC-DC converter 220, and the short-circuit fault detection device 420.

The short-circuit fault detection device 420 according to the present embodiment is a device that detects a short-circuit fault in the step-down DC-DC converter 220 which takes generated power of the solar cell 100 as an input and outputs a predetermined voltage. The short-circuit fault detection device 420 includes the controller 430 and the voltage detection unit 440.

Output terminals of the solar cell 100 are connected to input terminals of the DC-DC converter 220. The voltage detection unit 440 is connected between a positive electrode side output terminal and a negative electrode side output terminal of the solar cell 100. Output terminals of the DC-DC converter 220 may be open or may be connected with the power storage 300. The controller 430 is connected to the DC-DC converter 220 and the voltage detection unit 440.

The solar cell 100 is a solar power generation device that generates power by being irradiated with sunlight. The solar cell 100 is a solar cell module such as a solar panel. The solar cell 100 outputs the acquired generated power to the DC-DC converter 220.

The voltage detection unit 440 is configured with, for example, a voltage sensor. The voltage detection unit 440 is disposed to detect a voltage corresponding to the generated power that is output to the DC-DC converter 220 from the solar cell 100. The voltage detected by the voltage detection unit 440 is output as the detected voltage value Vin to the controller 430.

The controller 430 is configured with, for example, a microcomputer. The controller 430 can execute various types of control in the solar power generation system 20. As one example of the types of control, the controller 430 controls the switching elements constituting the DC-DC converter 220 to detect the presence of a short-circuit fault in each arm (element) of the DC-DC converter 220 based on the detected value output by the voltage detection unit 440 (the detected voltage value Vin).

A configuration of the DC-DC converter 220 illustrated in FIG. 4A includes the capacitor C1, the switching element M1 that is a step-down upper arm element, the switching element M2 that is a step-down lower arm element, the inductor L, and the capacitor C2.

The switching elements M1, M2 are active elements that can be controlled to be switched into an ON/OFF state by the controller 430. The switching elements M1, M2 are, for example, transistors. The switching elements M1, M2 can cause a current to flow in one direction when the switching elements M1, M2 are controlled into the ON state. For example, MOSTETs can be used as the transistors as illustrated in FIG. 4A.

The capacitors C1, C2 are passive elements that can store or discharge electrical energy (charge). The capacitors C1, C2 absorb and smooth out variations in voltage.

The inductor L is a passive element that can generate a magnetic field by a current flowing therein and store magnetic energy. The inductor L has a constant current characteristic such that the current does not change. For example, a choke coil can be used in the inductor L.

The source of the switching element M1 is connected to the positive electrode output terminal of the solar cell 100. The drain of the switching element M1 is connected to the source of the switching element M2. The drain of the switching element M2 is connected to the negative electrode output terminal of solar cell 100. The gates of the switching elements M1, M2 are connected to the controller 430. The capacitor C1 is connected between the input terminals of the DC-DC converter 220. A first end of the inductor L is connected to the connection point of the drain of the switching element M1 and the source of the switching element M2. A second end of the inductor L is connected to the capacitor C2 that is grounded.

The DC-DC converter 220 forms a step-down circuit by the switching element M1, the switching element M2, and the inductor L. The step-down circuit steps down the output voltage from the solar cell 100 and outputs the stepped-down voltage to the power storage 300.

FIG. 4B illustrates a method of control and determination performed by the controller 430 for the DC-DC converter 220 illustrated in FIG. 4A. For each target arm (element) on which the short-circuit fault determination is performed, FIG. 4B illustrates a state where the switching elements M1, M2 are controlled into the ON/OFF state (combination), and a short-circuit fault determination condition that is based on the detected voltage value Vin of the voltage detection unit 440.

A determination as to the presence of a short-circuit fault in the upper arm (switching element M1) is performed based on the detected voltage value Vin of the voltage detection unit 440 at the time of controlling the switching element M1 into the "OFF" state (applying an OFF voltage to the gate of the switching element M1) and controlling the switching element M2 into the "ON" state (applying an ON voltage to the gate of the switching element M2). The switching elements are controlled into the ON/OFF state such that a short-circuit path is formed in the DC-DC converter 220 when the detection target upper arm (element) has a short-circuit fault.

In the control state, a current does not flow between the source and the drain of the switching element M1 when the upper arm (switching element M1) does not have a short-circuit fault. Thus, the detected voltage value Vin of the voltage detection unit 440 is equal to the voltage output from the solar cell 100, for example, the maximum power point voltage VMPP. When, for example, the upper arm (switching element M1) has a short-circuit fault causing a flow of current between the source and the drain of the upper arm (switching element M1), the detected voltage value Vin of the voltage detection unit 440 is decreased to the short-circuit voltage Vs.

A determination as to the presence of a short-circuit fault in the lower arm (switching element M2) is performed based on the detected voltage value Vin of the voltage detection unit 440 at the time of controlling the switching element M1 into the "ON" state and controlling the switching element M2 into the "OFF" state. The switching elements are controlled into the ON/OFF state such that a short-circuit path is formed in the DC-DC converter 220 when the detection target lower arm (element) has a short-circuit fault.

In the control state, a current does not flow between the source and the drain of the switching element M2 when the lower arm (switching element M2) does not have a short-circuit fault. Thus, the detected voltage value Vin of the voltage detection unit 440 is equal to, for example, the maximum power point voltage VMPP output from the solar cell 100. When, for example, the lower arm (switching element M2) has a short-circuit fault causing a flow of current between the source and the drain of the lower arm (switching element M2), the detected voltage value Vin of the voltage detection unit 440 is decreased to the short-circuit voltage Vs.

By using the phenomenon, when the voltage threshold Vth1 is optimally set in advance between the maximum power point voltage VMPP and the short-circuit voltage Vs, a determination as to whether or not the upper arm (switching element M1) or the lower arm (switching element M2) has a short-circuit fault can be performed by determining whether or not the detected voltage value Vin of the voltage detection unit 440 is less than the voltage threshold Vth1. That is, a determination as to whether or not the upper arm (switching element M1) or the lower arm (switching element M2) has a short-circuit fault can he easily performed based on the detected voltage value Vin of the voltage detection unit 440.

Action and Effect in Second Embodiment

The short-circuit fault detection device 420 according to the second embodiment of the present disclosure controls the switching elements constituting the DC-DC converter 220 into the ON/OFF state in combinations that form a short-circuit path in the DC-DC converter 220 at the time of a short-circuit fault of the detection target arm (element), in the case of detecting a short-circuit fault in the upper arm switching element M1 or the lower am switching element M2 constituting the step-down DC-DC converter 220.

The control can cause the voltage value Vin on the input terminal side of the DC-DC converter 220 to which the solar cell 100 is connected to be decreased below the preset voltage threshold Vth1 when the detection target arm (switching element) has a short-circuit fault. Thus, when the voltage value Vin on the input terminal side of the DC-DC converter 220 is detected, a determination as to whether or not the detection target arm (switching element) has a short-circuit fault can be easily performed based on the detected voltage value Vin.

The step-down DC-DC converter 220 may be considered to have a case in which the arm (switching element) cannot be controlled into the "ON" state at all times by a hardware configuration. In such a case, controlling the arm (switching element) into the ON state may be replaced with controlling the arm (switching element) into the ON state at a duty cycle of approximately 95%. In addition, controlling the arm (switching element) into the OFF state may be replaced with controlling the arm (switching element) into the ON state at a duty cycle of approximately 5% (=100−95).

The short-circuit fault detection device of the present disclosure can be used for a DC-DC converter or the like used in a solar power generation system and is particularly useful when, for example, easy detection of the occurrence of a short-circuit fault is desired.

What is claimed is:

1. A short-circuit fault detection device that detects a short-circuit fault in a step-up and step-down DC-DC converter which takes generated power of a solar cell as an input and outputs a predetermined voltage to a power storage, the DC-DC converter including a step-up upper arm, a step-up lower arm, a step-down upper arm, and a step-down lower arm, the short-circuit fault detection device comprising:

a voltage detection unit that detects a voltage output to the DC-DC converter from the solar cell;

a current detection unit that detects a current output to the power storage from the DC-DC converter; and a controller configured to control switching elements constituting the DC-DC converter to determine whether or not each arm of the DC-DC converter has a short-circuit fault based on a detected voltage value that is a detected value of the voltage detection unit, and a detected current value that is a detected value of the current detection unit, wherein the controller is configured to determine whether or not the step-down upper arm has a short-circuit fault based on the detected voltage value at a time of controlling a switching element of the step-down upper arm into an OFF state and controlling a switching element used in any one of the step-down lower arm and the step-up lower arm into an ON state, determine whether or not at least one of the step-down lower arm and the step-up lower arm has a short-circuit fault based on the detected voltage value at a time of controlling the switching element of the step-down upper arm into the ON state and controlling all switching elements used in the step-down lower arm and the step-up lower arm into the OFF state, and determine whether or not the step-up upper arm has a short-circuit fault based on the detected current value at a time of controlling all switching elements used in the step-down lower arm, the step-up upper arm, and the step-up lower arm into the OFF state.

2. The short-circuit fault detection device according to claim 1, wherein the controller is configured to determine whether or not the detected voltage value is smaller than a predetermined voltage value at a time of controlling the switching element of the step-down upper arm into the OFF state and controlling the switching element used in any one of the step-down lower arm and the step-up lower arm into the ON state, and when the detected voltage value is smaller than the predetermined voltage value, determine that the step-down upper arm has a short-circuit fault.

3. The short-circuit fault detection device according to claim 1, wherein the controller is configured to determine whether or not the detected voltage value is smaller than a predetermined voltage value at a time of controlling the switching element of the step-down upper arm into the ON state and controlling all switching elements used in the step-down lower arm and the step-up lower arm into the OFF state, and when the detected voltage value is smaller than the predetermined voltage value, determine that at least one of the step-down lower arm and the step-up lower arm has a short-circuit fault.

4. The short-circuit fault detection device according to claim 1, wherein the controller is configured to determine whether or not the detected current value is smaller than a predetermined current value at a time of controlling all switching elements used in the step-down lower arm, the step-up upper arm, and the step-up lower arm into the OFF state, and when the detected current value is smaller than the predetermined current value, determine that the step-up upper arm has a short-circuit fault.

5. A short-circuit fault detection device that detects a short-circuit fault in a step-down DC-DC converter which takes generated power of a solar cell as an input and outputs a predetermined voltage, the DC-DC converter including an upper arm and a lower arm, the short-circuit fault detection device comprising:

a voltage detection unit that detects a voltage output to the DC-DC converter from the solar cell; and a controller configured to control switching elements constituting the DC-DC converter to determine whether or not each arm of the DC-DC converter has a short-circuit fault based on a detected voltage value that is a detected value of the voltage detection unit, wherein the controller is configured to determine whether or not the upper arm has a short-circuit fault based on the detected voltage value at a time of controlling a switching element of the upper arm into an OFF state and controlling a switching element of the lower arm into an ON state, and determine whether or not the lower arm has a short-circuit fault based on the detected voltage value at a time of controlling the switching element of the upper arm into the ON state and controlling the switching element of the lower arm into the OFF state.

6. The short-circuit fault detection device according to claim 5, wherein the controller is configured to determine whether or not the detected voltage value is smaller than a predetermined voltage value at a time of controlling the switching element of the upper arm into the OFF state and controlling the switching element of the lower arm into the ON state, and when the detected voltage value is smaller than the predetermined voltage value, determine that the upper arm has a short-circuit fault.

7. The short-circuit fault detection device according to claim 5, wherein the controller is configured to determine whether or not the detected voltage value is smaller than a predetermined voltage value at a time of controlling the switching element of the upper arm into the ON state and controlling the switching element of the lower arm into the OFF state, and when the detected voltage value is smaller than the predetermined voltage value, determine that the lower arm has a short-circuit fault.

\* \* \* \* \*